(12) United States Patent
Probst et al.

(10) Patent No.: US 11,851,531 B2
(45) Date of Patent: Dec. 26, 2023

(54) ALIPHATIC EPOXY-TERMINATED POLYSULFIDE POLYMER

(71) Applicant: NOURYON CHEMICALS INTERNATIONAL B.V., Arnhem (NL)

(72) Inventors: Christian Probst, Plauen (DE); Olaf Klobes, Greiz (DE); Volker Burkhardt, Mörfelden-Walldorf (DE)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 17/303,020

(22) Filed: May 18, 2021

(65) Prior Publication Data

US 2021/0363305 A1   Nov. 25, 2021

(30) Foreign Application Priority Data

May 19, 2020   (EP) ..................... 20175540

(51) Int. Cl.
*C08G 75/14* (2006.01)
*C08L 63/00* (2006.01)
*C08G 85/00* (2006.01)

(52) U.S. Cl.
CPC .............. *C08G 75/14* (2013.01); *C08L 63/00* (2013.01); *C08G 85/004* (2013.01)

(58) Field of Classification Search
CPC ........ C08G 75/14; C08G 85/004; C08L 63/00
USPC ........................................................ 528/373
See application file for complete search history.

(56) References Cited

U.S. PATENT DOCUMENTS

| 5,610,243 | A | * | 3/1997 | Vietti ...................... C08L 63/00 528/109 |
| 7,087,304 | B1 | | 8/2006 | Woods et al. |
| 8,889,802 | B2 | | 11/2014 | Rappoport et al. |
| 9,771,457 | B2 | | 9/2017 | Tobis et al. |
| 2005/0119449 | A1 | | 6/2005 | Bergfeld et al. |
| 2005/0131207 | A1 | | 6/2005 | Bergfeld et al. |

(Continued)

FOREIGN PATENT DOCUMENTS

| CN | 110577623 A | 12/2019 |
| EP | 0171198 A1 | 2/1986 |

(Continued)

*Primary Examiner* — David T Karst
(74) *Attorney, Agent, or Firm* — LORENZ & KOPF, LLP

(57) ABSTRACT

An aliphatic epoxy-terminated polysulfide polymer has the formula R"—CHOH—CH2-S—R—(Sy-R)t-S—CH2-CHOH—R" and is formed by a process, where each R is independently chosen from branched alkanediyl or branched arenediyl groups and groups with the structure —(CH2)a-O—(CH2)b-O—(CH2)c- and about 0 to about 20% of the number of R-groups are branched alkanediyl or branched arenediyl groups and about 80 to about 100% of the number of R-groups have the structure —(CH2)a-O—(CH2)b-O—(CH2)c-, where t is from about 1 to about 60, y is an average value of from about 1.0 to about 2.5, b is an integer value of from about 1 to about 8, and a and c are independently integers from about 1 to about 10, and where each R" is independently a particular radical, where m, n, o, p, q and r independently have a value of from about 1 to about 10.

20 Claims, 3 Drawing Sheets

(56) References Cited

U.S. PATENT DOCUMENTS

2006/0287466 A1    12/2006   Bergfeld et al.
2019/0194447 A1     6/2019   Oka et al.

FOREIGN PATENT DOCUMENTS

| EP | 0562231 A2 | 9/1993 |
|----|------------|--------|
| JP | 2003183624 A | 7/2003 |
| JP | 2016527361 A | 9/2016 |
| RU | 2677151 C1 | 1/2019 |
| WO | 03099908 A1 | 12/2003 |
| WO | 2004099283 A1 | 11/2004 |
| WO | 2010038431 A1 | 4/2010 |
| WO | 2017221542 A1 | 12/2017 |

* cited by examiner

ALIPHATIC EPOXY-TERMINATED POLYSULFIDE POLYMER

CROSS-REFERENCE TO RELATED APPLICATION

This application claims priority to European Patent Application No. 20175540.2, filed May 19, 2020, the entire content of which is incorporated by reference herein.

TECHNICAL FIELD

This present disclosure relates to an aliphatic epoxy-terminated polysulfide polymer and a process for preparing the same.

BACKGROUND

Epoxy-terminated polysulfide polymers are excellent binders for epoxy systems, including adhesives, coatings and sealants, combining the flexibility, chemical resistance and crack bridging of a polysulfide with the chemical reactivity of epoxy resin technology.

Epoxy-terminated polysulfide polymers and methods for their production have long been known.

WO 03/099908 A1, for example, discloses a method for the production of polymer polysulfides comprising epoxy end groups by reacting polysulfides comprising thiol end groups with epichlorohydrin in the presence of aqueous alkali lye. The epichlorohydrin is initially introduced and the polysulfide is added in a metered fashion. The reaction mixture is then worked-up.

A problem with the method of WO 03/099908 A1 however, is that it takes over 16 hours to complete. In addition, the method requires the use of an organic solvent, involved filtering and distillation steps, and the handling of highly volatile and highly flammable epichlorohydrin. Furthermore, residues of epichlorohydrin are inevitably included in the product.

An alternative method for preparing epoxy-terminated polysulfides is described in WO 2004/099283 A1. Here, epoxy resins based on bisphenol A and/or bisphenol F are reacted with polysulfides in the presence of quaternary ammonium compounds as a catalyst at a temperature of from about 20 to 150° C. The exemplified reaction is a one pot and one step synthesis that does not require any organic solvent. Furthermore, the reaction is complete in approximately 4 hours.

However, the aromatic epoxy-terminated polysulfide polymers of WO 2004/099283 A1, while easier, less costly, more eco-friendly and quicker to produce, have been found to be less storage stable and less flexible than the aliphatic polymers of WO 03/099908 A1.

Accordingly, there is a need to provide improved epoxy-terminated polysulfide polymers that can be easily prepared, and which have good storage stability and good flexibility.

BRIEF SUMMARY

In a first aspect, the present disclosure provides an aliphatic epoxy-terminated polysulfide polymer with the formula

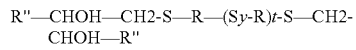

where each R is independently chosen from branched alkanediyl or branched arenediyl groups and groups with the structure —($CH_2$)a-O—($CH_2$)b-O—($CH_2$)c- and about 0 to about 20% of the number of R-groups in the polymer are branched alkanediyl or branched arenediyl groups and about 80 to about 100% of the number of R-groups in the polymer have the structure —($CH_2$)a-O—($CH_2$)b-O—($CH_2$)c-, where t has a value of from about 1 to about 60, y is an average value of from about 1.0 to about 2.5, b is an integer value of from about 1 to about 8, and a and c are independently integers of from about 1 to about 10, and where each R" is independently a radical having a formula chosen from

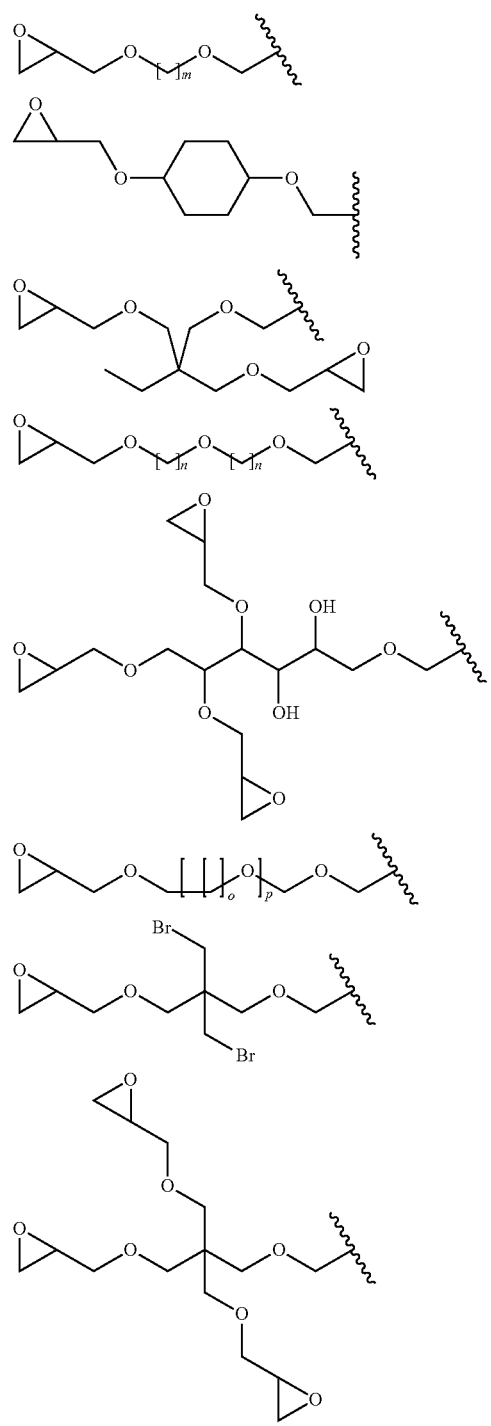

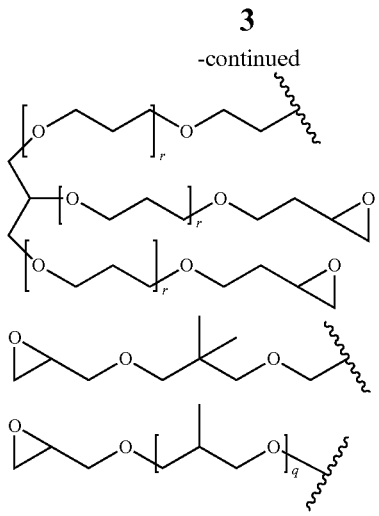

where, each of m, n, o, p, q and r independently have a value of from about 1 to about 10.

Advantageously, aliphatic epoxy-terminated polysulfide polymers in accordance with the first aspect of the present disclosure can be produced in a simple one pot and one step synthesis. The reaction is complete in approximately 6 hours and does not require any organic solvent or any filtering or distillation steps. In addition, in contrast to WO 03/099908 A1, the reaction does not require any dangerous reactants to be handled.

Furthermore, aliphatic epoxy-terminated polysulfide polymers in accordance with the first aspect of the present disclosure have been found to have improved properties over the aromatic epoxy-terminated polysulfide polymers of WO 2004/099283 A1, including improved storage stability, increased flexibility and lower viscosity.

In a second aspect, the present disclosure provides a process for preparing an aliphatic epoxy-terminated polysulfide polymer comprising the step of reacting at least one polyepoxide with at least one polysulfide in the presence of an amine catalyst at a temperature of from about 20 to about 150° C., wherein the at least one polysulfide is a compound of the formula $$HS—R—(Sy-R)t-SH \quad (I)$$

where each R is independently chosen from branched alkanediyl or branched arenediyl groups and groups with the structure —(CH2)a-O—(CH2)b-O—(CH2)c- and about 0 to about 20% of the number of R-groups in the polymer are branched alkanediyl or branched arenediyl groups and about 80 to about 100% of the number of R-groups in the polymer have the structure —(CH2)a-O—(CH2)b-O—(CH2)c-, where t has a value of from about 1 to about 60, y is an average value of from about 1.0 to about 2.5, b is an integer value of from about 1 to about 8, and a and c are independently integers of from about 1 to about 10, and wherein the at least one polyepoxide is a compound having a formula chosen from

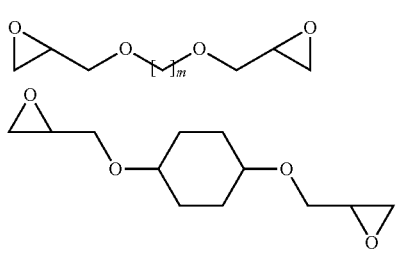

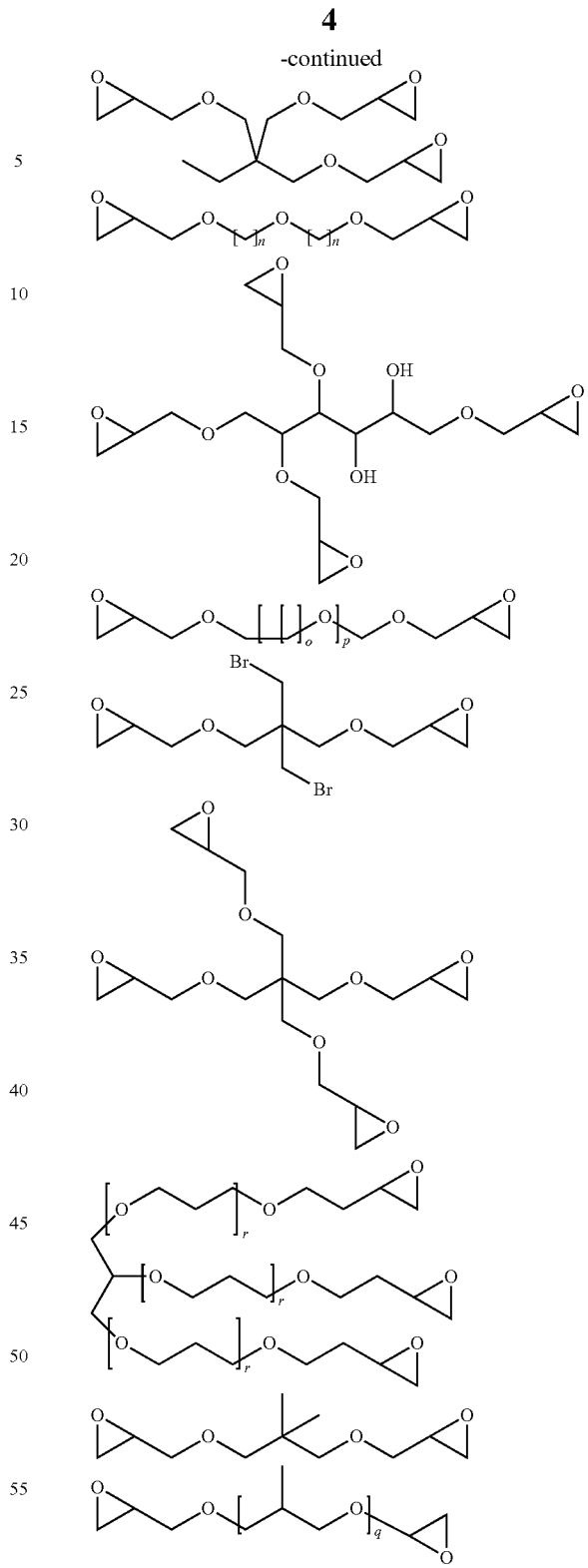

where, each of m, n, o, p, q and r independently have a value of from about 1 to about 10.

This solvent-free, amine-catalyzed addition reaction between the at least one SH-terminated polysulfide and the at least one polyepoxide provides a safer, quicker, easier, less costly and more environmentally friendly route to aliphatic epoxy-terminated polysulfide polymers than WO 03/099908 A1.

BRIEF DESCRIPTION OF THE DRAWINGS

The present disclosure will hereinafter be described in conjunction with the following drawing figures, wherein like numerals denote like elements, and.

DETAILED DESCRIPTION

Figure 1:
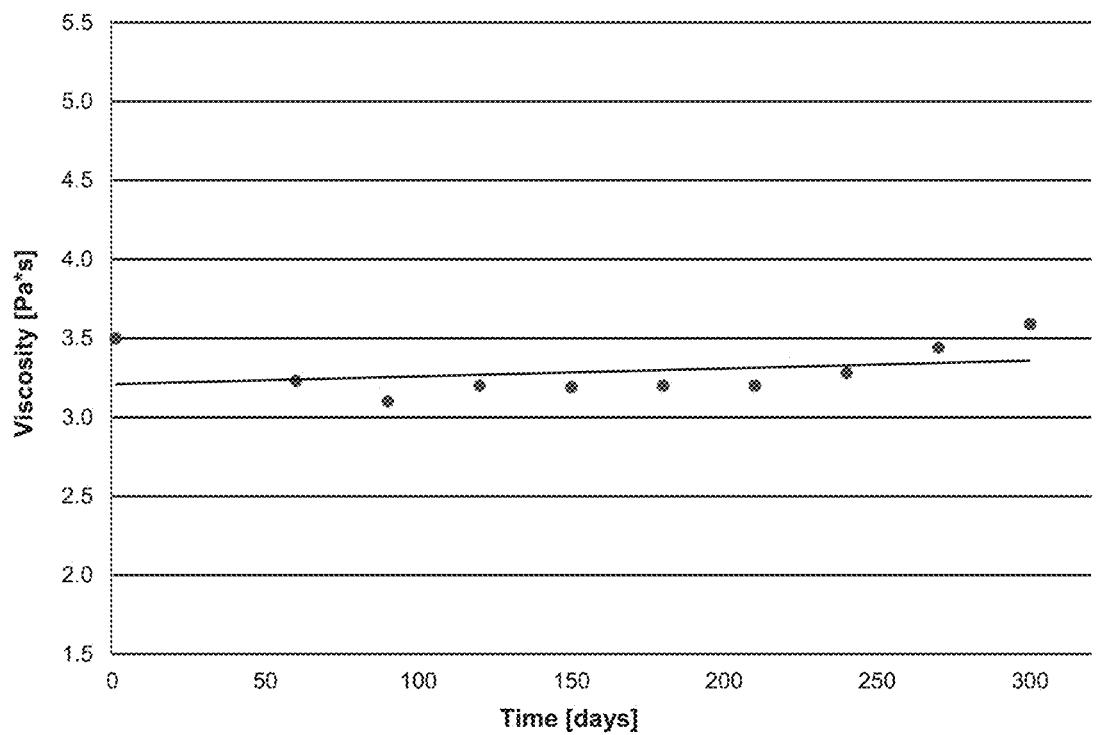
FIG. 1 shows the viscosity of the epoxy-terminated polysulfide polymer prepared in Example 1 upon storage from about 0 to about 300 days.

The following detailed description is merely exemplary in nature and is not intended to limit the disclosure or the application and uses of the disclosure. Furthermore, there is no intention to be bound by any theory presented in the preceding background of the disclosure or the following detailed description As indicated above, the present disclosure is directed to an aliphatic epoxy-terminated polysulfide polymer with the formula

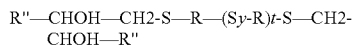
R"—CHOH—CH2-S—R—(Sy-R)t-S—CH2-CHOH—R"

where each R is independently chosen from branched alkanediyl or branched arenediyl groups and groups with the structure —(CH2)a-O—(CH2)b-O—(CH2)c- and about 0 to about 20% of the number of R-groups in the polymer are branched alkanediyl or branched arenediyl groups and about 80 to about 100% of the number of R-groups in the polymer have the structure —(CH2)a-O—(CH2)b-O—(CH2)c-, where t has a value of from about 1 to about 60, y is an average value of from about 1.0 to about 2.5, b is an integer value of from about 1 to about 8, and a and c are independently integers of from about 1 to about 10, and where each R" is independently a radical having a formula chosen from

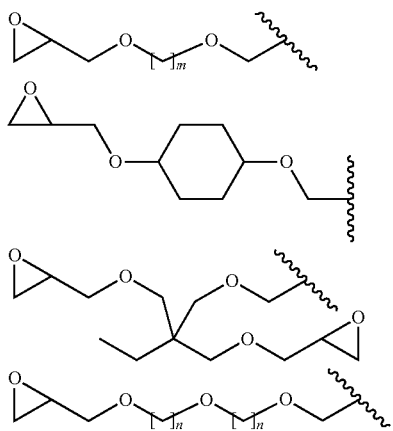

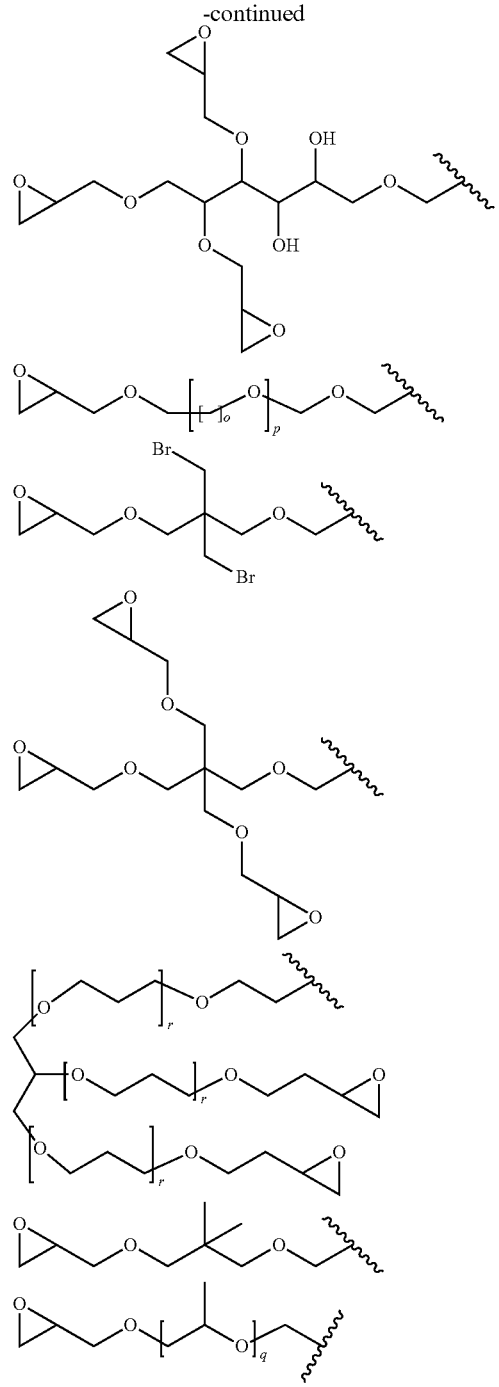

where, each of m, n, o, p, q and r independently have a value of from about 1 to about 10, preferably from about 2 to about 8, more preferably from about 3 to about 7, and most preferably from about 2 to about 6.

Preferably, t has a value of from about 1 to about 40, more preferably from about 1 to about 20, and most preferably from about 5 to about 10, while y is an average value of from about 1.4 to about 2.4, more preferably about 1.8 to about 2.2, and most preferably about 2. With regard to the structure —(CH2)a-O—(CH2)b-O—(CH2)c-, b is preferably an integer value of from about 1 to about 4, most preferably 1 or about 2, and a and c are preferably independently integers of from about 1 to about 6, most preferably about 2. Preferably a and c are the same integer value.

As indicated above, each R" may be the same or different. Preferably, each R" is the same.

In a preferred embodiment, R" is independently a radical having a formula chosen from

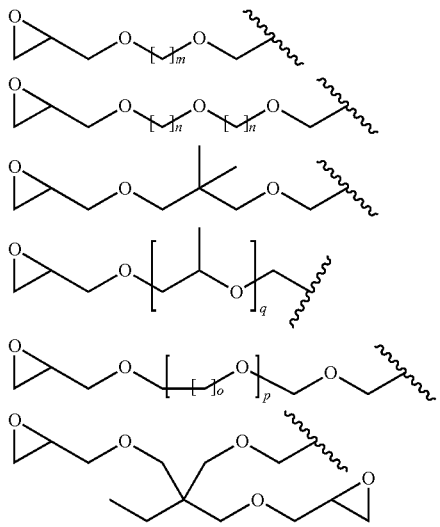

where m, n, o, p and q independently have a value of from about 1 to about 10, preferably from about 2 to about 8, more preferably from about 3 to about 7, and most preferably from about 2 to about 6.

Preferably, R" is independently a radical having a formula chosen from

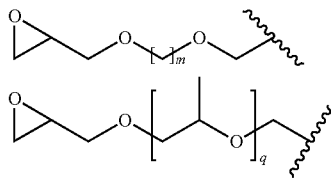

where m has a value of from about 1 to 10, preferably from about 2 to about 8, more preferably from about 3 to about 7, and most preferably from about 4 to about 6, and q has a value of from about 1 to about 10, preferably from about 1 to about 5, and more preferably from about 2 to about 3.

Especially preferred is an aliphatic epoxy-terminated polysulfide polymer, as described above, where R" is a radical having the formula

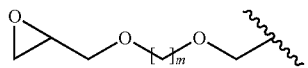

where m has a value of from about 4 to about 6, preferably about 4 or about 6, more preferably about 4.

The aliphatic epoxy-terminated polysulfide polymer may have the structure R"—CHOH—CH2-S—(CH2)a-O—(CH2)b-O—(CH2)c-[Sy-(CH2)a-O—(CH2)b-O—(CH2)c]t-S—CH2-CHOH—R", where R", a, b, c, y, and t have the same meaning as described above.

Advantageously, the aliphatic epoxy-terminated polysulfide polymers of the present disclosure are low viscosity liquids at room temperature. This makes them particularly suitable for use in sprayable formulations, even without solvent. In particular, the aliphatic epoxy-terminated polysulfide polymer may have a viscosity, at room temperature, of from about 0.5 to about 50.0 Pa*s, preferably from about 1.0 to about 20.0 Pa*s, more preferably from about 2.0 to about 10.0 Pa*s, and most preferably from about 3.0 to about 4.0 Pa*s, as measured with a cone/plate viscosimeter (described below).

The aliphatic epoxy-terminated polysulfide polymers may have an oxirane-oxygen content of from about 0.1 to about 20.0%, preferably from about 0.5 to about 10%, more preferably from about 1.0 to about 5.0%, and most preferably from about 2.0 to about 3.0%, as determined according to EN ISO 7142:2007.

The present disclosure is further directed to a process for the production of an aliphatic epoxy-terminated polysulfide polymer comprising the step of reacting at least one polyepoxide with at least one polysulfide in the presence of an amine catalyst at a temperature of from about 20 to about 150° C., wherein the at least one polysulfide is a compound of the formula

HS—R—(Sy-R)t-SH    (I)

where each R is independently chosen from branched alkanediyl or branched arenediyl groups and groups with the structure —(CH2)a-O—(CH2)b-O—(CH2)c- and about 0 to about 20% of the number of R-groups in the polymer are branched alkanediyl or branched arenediyl groups and about 80 to about 100% of the number of R-groups in the polymer have the structure —(CH2)a-O—(CH2)b-O—(CH2)c-, where t has a value of from about 1 to about 60, y is an average value of from about 1.0 to about 2.5, b is an integer value of from about 1 to about 8, and a and c are independently integers of from about 1 to about 10, and wherein the at least one polyepoxide is a compound having a formula chosen from

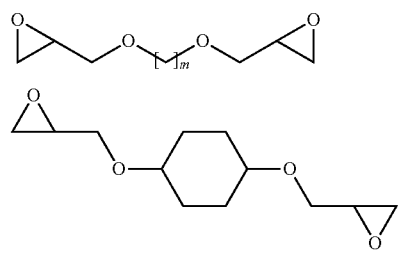

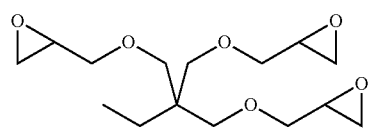

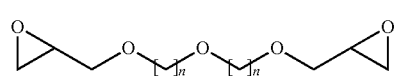

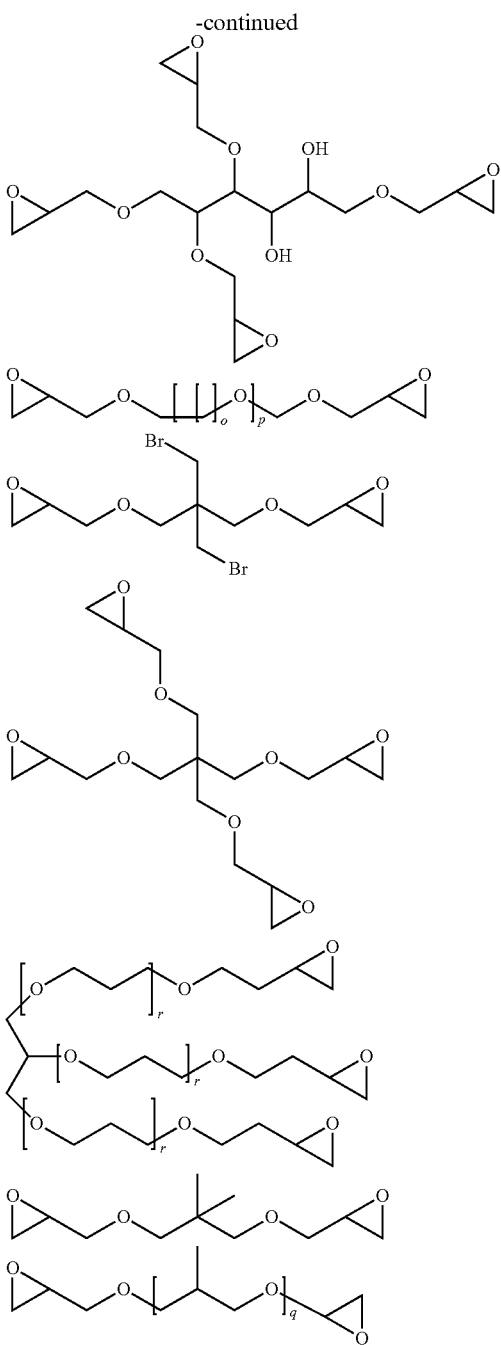

where, each of m, n, o, p, q and r independently have a value of from about 1 to about 10, preferably from about 2 to about 8, more preferably from about 3 to about 7, and most preferably from about 2 to about 6.

Preferably, t has a value of from about 1 to about 40, more preferably from about 1 to about 20, and most preferably from about 5 to about 10, while y is an average value of from about 1.4 to about 2.4, more preferably about 1.8 to about 2.2, and most preferably about 2. With regard to the structure —(CH2)a-O—(CH2)b-O—(CH2)c-, b is preferably an integer value of from about 1 to about 4, most preferably 1 or about 2, and a and c are preferably independently integers of from about 1 to about 6, most preferably 2. Preferably a and c are the same integer value.

As indicated above, the process comprises reacting at least one polyepoxide with at least one polysulfide. This includes reacting one or a mixture of two or more different polyepoxides with one or a mixture of two or more different polysulfides. Preferably, the process comprises reacting one polyepoxide with one polysulfide.

In a preferred embodiment, the at least one polyepoxide is chosen from

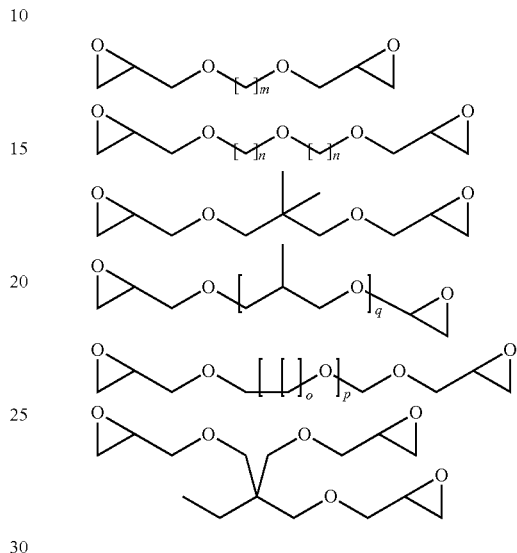

where m, n, o, p and q independently have a value of from about 1 to about 10, preferably from about 2 to about 8, more preferably from about 3 to about 7, and most preferably from about 2 to about 6.

Preferably, the at least one polyepoxide is chosen from

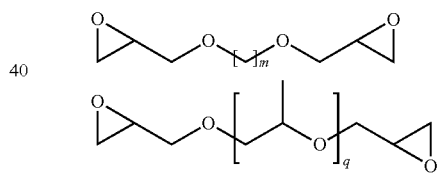

where m has a value of from about 1 to about 10, preferably from about 2 to about 8, more preferably from about 3 to about 7, and most preferably from about 4 to about 6, and q has a value of from about 1 to about 10, preferably from about 1 to about 5, and more preferably from about 2 to about 3. The at least one polyepoxide is preferably 1,4-butanediol diglycidyl ether.

The at least one polysulfide may have the structure HS—(CH2)a-O—(CH2)b-O—(CH2)c-[Sy-(CH2)a-O—(CH2)b-O—(CH2)c]t-SH, where a, b, c, y, and t have the same meaning as described above.

Preferably, the reaction is carried out in a molar ratio of about 2 mol of polysulfide to about 4 mol of polyepoxide, preferably about 1 mol of polysulfide to about 2.5 mol of polyepoxide. Preferably, the polysulfide is initially introduced and the polyepoxide is metered in. It is advantageous to meter into a vessel in which the amine catalyst used is already present. However, it is also possible to meter the amine catalyst into the vessel while the polysulfide and/or the polyepoxide is being metered in.

The amine catalyst may be a tertiary or quaternary amine. In particular, the amine catalyst may be chosen from methyl diethanolamine, triethylene diamine, methyldiethanol amine, bis(dimethylaminoethyl)ether, N,N-dimethylpiperidine, benzyldimethylamine, 2,4,6-tris(dimethylaminomethyl)phenol, dimethyldioctadecylammonium chloride, diethyl ester dimethyl ammonium chloride, benzyl triethyl ammonium chloride, methyl tricapryl ammonium chloride, methyl tributyl ammonium chloride, and methyl trioctyl ammonium chloride.

Preferably, the amine catalyst is a quaternary ammonium salt catalyst chosen from dimethyl dioctadecyl ammonium chloride, diethyl ester dimethyl ammonium chloride, benzyl triethyl ammonium chloride, methyl tricapryl ammonium chloride, methyl tributyl ammonium chloride, and methyl trioctyl ammonium chloride, preferably, methyl trioctyl ammonium chloride.

The amine catalyst is used in catalytic amounts. The specific amount is dependent on the chosen reaction temperature and on the reactivity of the polyepoxides used and can be determined by an average person skilled in the art by simple preliminary experiments. In general, from about 0.01 to about 0.5% by weight, based on the total weight of reactants, is sufficient.

The reaction of the at least one polyepoxide with the at least one polysulfide can be carried out at room temperature, but higher temperatures are preferably employed. A temperature range of from about 20 to about 150° C. is suitable. Preferably, a temperature of from about 30 to about 120° C. is used, more preferably from about 40 to about 100° C., more preferably from about 50 to about 90° C., and most preferably from about 60 to about 80° C. The temperature of the exothermic addition reaction can be controlled by cooling the reactor. By using a coolable reactor, the temperature during the reaction can be exactly maintained, for example, between about 50 and about 80° C. The reaction is preferably carried out whilst stirring.

As indicated above, the reaction is carried out without the addition of a solvent, that is, the reaction is solvent free. This is advantageous in terms of the safety, ease, cost and environmental impact of the process.

The aliphatic epoxy-terminated polysulfide polymers of the present disclosure can be used as a binder for epoxy systems, including adhesives, coatings and sealants. Polyamines, polythiols or other customary compounds having at least two reactive hydrogen atoms can be used as curing agents.

The aliphatic epoxy-terminated polysulfide polymers of the present disclosure are especially useful for coatings and can be used in sprayable formulations without a solvent.

It is noted that various elements of the present disclosure, including but not limited to preferred ranges for the various parameters, can be combined unless they are mutually exclusive.

The present disclosure will be elucidated by the following examples without being limited thereto or thereby.

EXAMPLES

Viscosity Measurement

Viscosity is measured with a cone/plate viscosimeter (MCR 102, Anton Paar) with a temperature control unit keeping the sample at a constant temperature of 25° C.±0.1 K. The measurement is carried out at 6 different shear stresses/shear gradients (ascending). Depending on the measuring principle, the values for the shear stress ti or for the shear rate y are specified in the following ranges:
Shear stress range: $100 < \tau < 5*10^2$ Pa ($\tau1 \ldots \tau n; n>6$)
Shear rate: $10^{-1} < \gamma < 5*10^2$ s$^{-1}$ ($\gamma1 \ldots \gamma n; n>6$)

Sample Storage

Samples were stored at a temperature of 23° C.±2K and a relative humidity of 50±5%. The viscosity was measured at regular intervals using the method described above.

Oxirane-Oxygen Content Measurement

Oxirane-oxygen content was determined according to EN ISO 7142:2007 by addition of tetra ethylene ammonium bromide and subsequently titration with perchloric acid against crystal violet.

Shore-Hardness Measurement

Shore-hardness measurement was carried out on a Bareiss Digitest measuring equipment in accordance with DIN ISO 7619-1. The Shore hardness is checked after a measuring time of 5 seconds and 3 minutes.

Elongation at Break and Tensile Strength Measurement

To measure the elongation at break and the tensile strength, shoulder bars were punched out of the cured films in accordance with DIN 53504 S2 and inserted symmetrically into the TIRAtest 2410 tensile/elongation testing machine. The test specimens were stretched to break at a test speed of 100 mm/min and the physical parameters were calculated according to DIN 53504 S2.

Example 1: Preparation of Aliphatic Epoxy-Terminated Polysulfide Polymer 1263 g of polysulfide (Thioplast G4, Mw approx. 1100 g/mol, from Nouryon) is introduced into a 5-liter double-jacket reactor, equipped with an anchor agitator, bottom drain valve and metering device. The reactor is cooled with spring water and 1.5 g Aliquat 336 (methyl trioctyl ammonium chloride) is admixed whilst stirring. 800 g Epilox 13-21 (1,4-butanediol diglycidyl ether, from Leuna Harze) is then added to the reaction mixture in a continuously metered fashion by employing a reciprocating pump while vigorously stirring. The reactor is then heated to 60° C., while carefully monitoring the reaction temperature. The reaction temperature increases beyond 60° C. due to the exothermal nature of the addition reaction. After reaching the peak temperature of 75° C., the reaction mixture is stirred for another 2.5 hours. Afterwards, the reactor content is cooled to 20° C., the stirring apparatus is switched off, and the product is pumped off from the reactor.

Example 2: Storage Stability Tests

The aliphatic epoxy-terminated polysulfide polymer prepared in Example 1 was stored at a temperature of 23° C.±2K and a relative humidity of 50±5% for 300 days and viscosity was measured at regular intervals using the above method. The results are shown in FIG. 1.

For comparison, commercially available epoxy-terminated polysulfide polymers Thioplast EPS 25 (end-capped by epichlorohydrin, from Nouryon) and Thioplast EPS 70 (end-capped by diglycidyl-ether of bisphenol A/F resin, from Nouryon) were stored at a temperature of 23° C.±2K and a relative humidity of 50±5% for 12 months. The viscosities, measured at regular intervals using the method described above, are shown in FIGS. 2 and 3, respectively.

Figure 2:
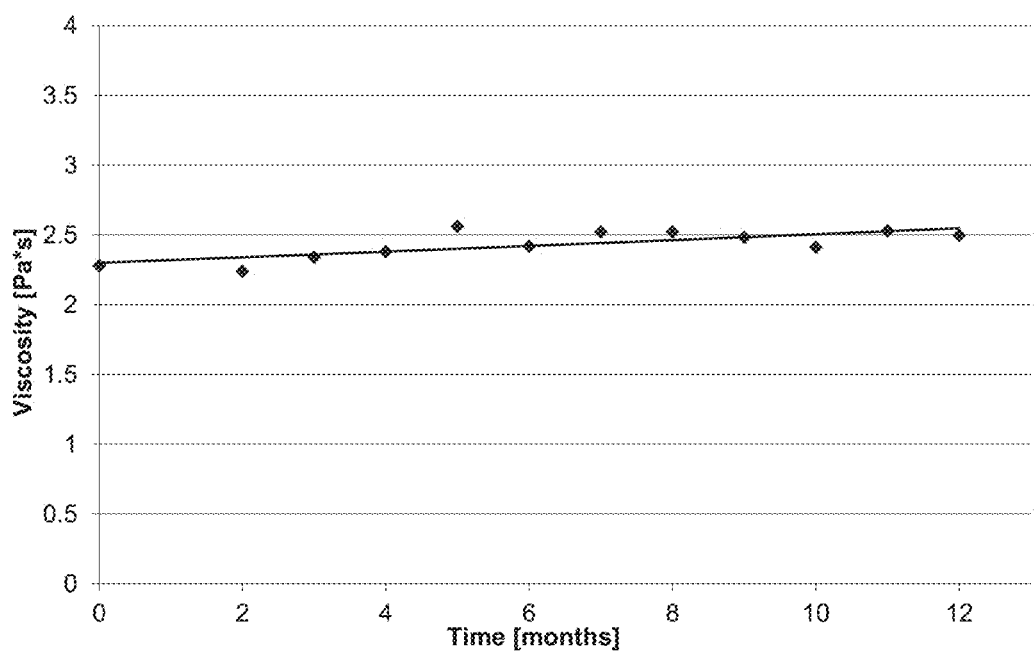
FIG. 2 shows the viscosity of Thioplast EPS 25 upon storage from about 0 to about 12 months.
Figure 3:
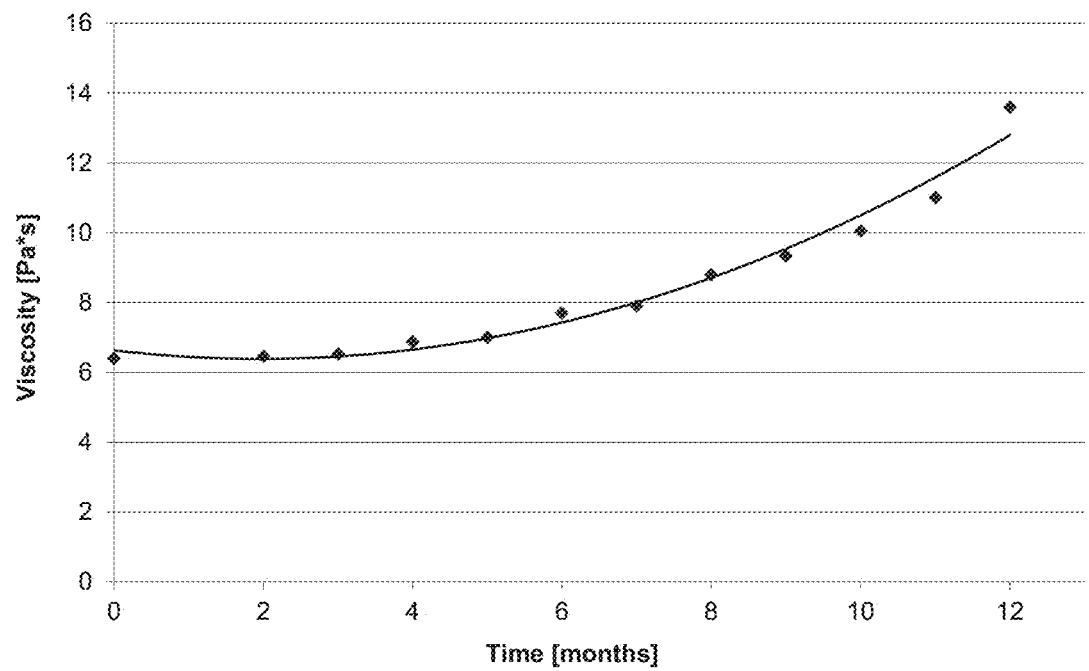
FIG. 3 shows the viscosity of Thioplast EPS 70 upon storage from about 0 to about 12 months.

From FIGS. 1-3, the aliphatic epoxy-terminated polysulfide polymers of Example 1 and Thioplast EPS 25 can be seen to increase only slightly in viscosity upon storage for 300 days. In contrast, the viscosity of aromatic Thioplast EPS 70 more than doubles. The results are included in Table 1.

TABLE 1 results of storage stability tests

| Epoxy-terminated polysulfide polymers | Increase in viscosity after 300 days (%) |
|---|---|
| Example 1 | 7.01 |
| Thioplast EPS 25 | 8.77 |
| Thioplast EPS 70 | 57.03 |

Example 3: Flexibility Tests

Figure 4A:
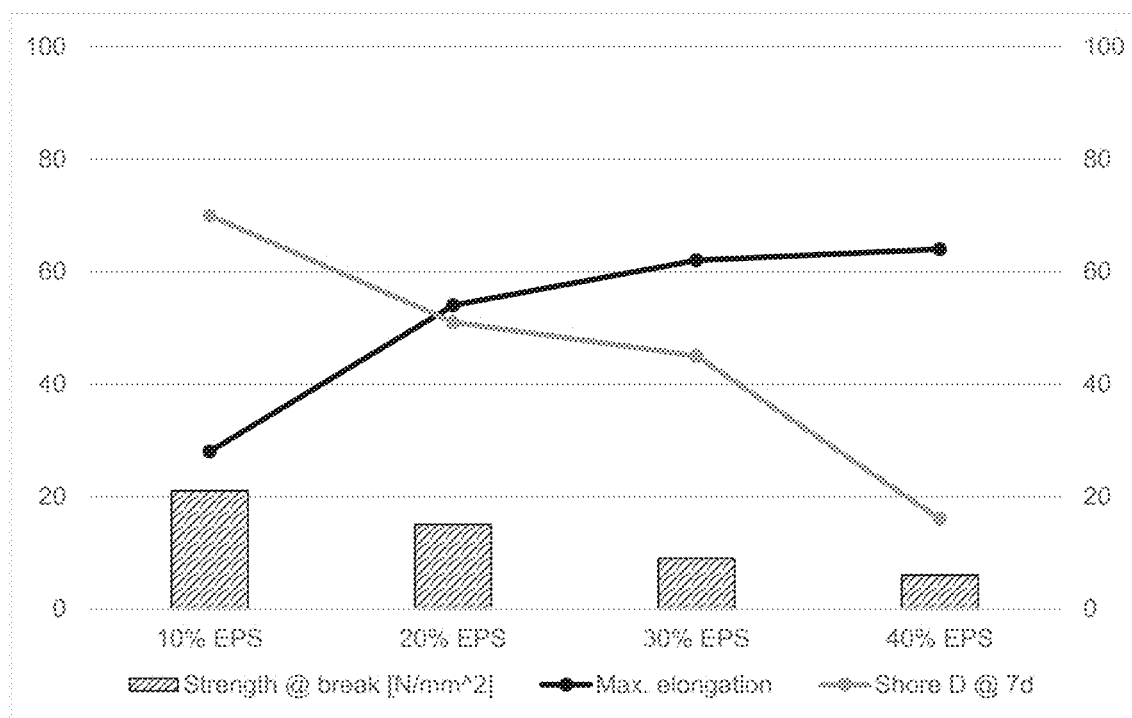
FIG. 4A shows the results of the flexibility tests of Example 3 using the polymer of Example 1.
Figure 4B:
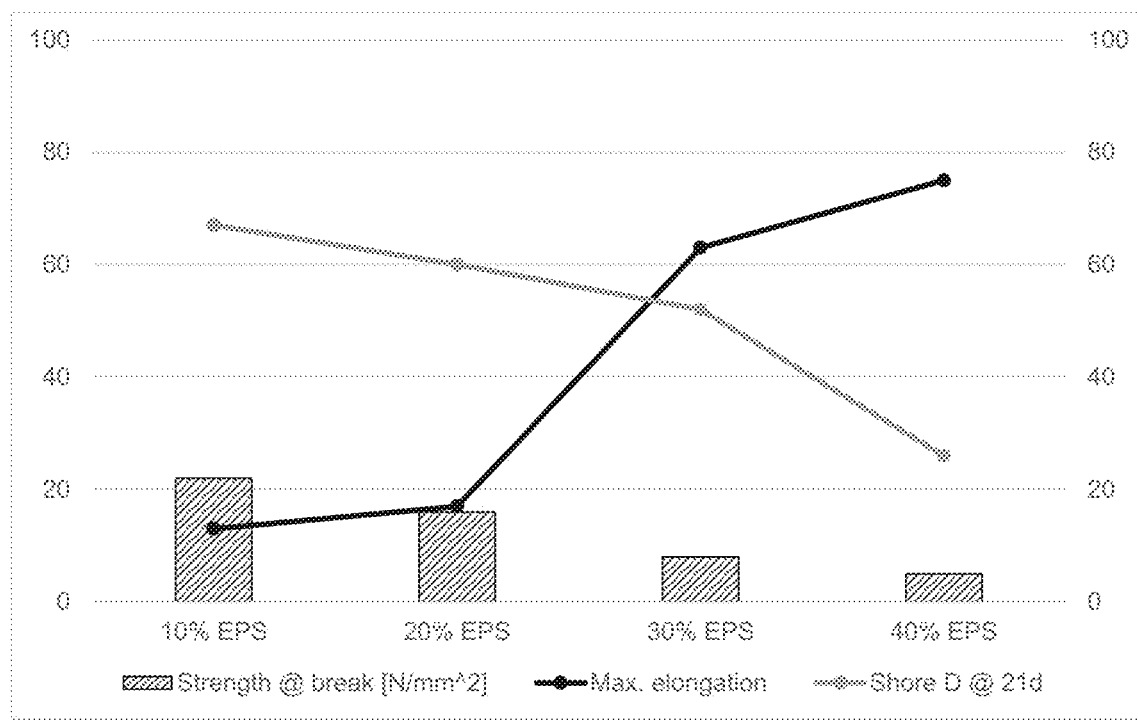
FIG. 4B shows the results of the flexibility tests of Example 3 using Thioplast EPS 25.
Figure 4C:
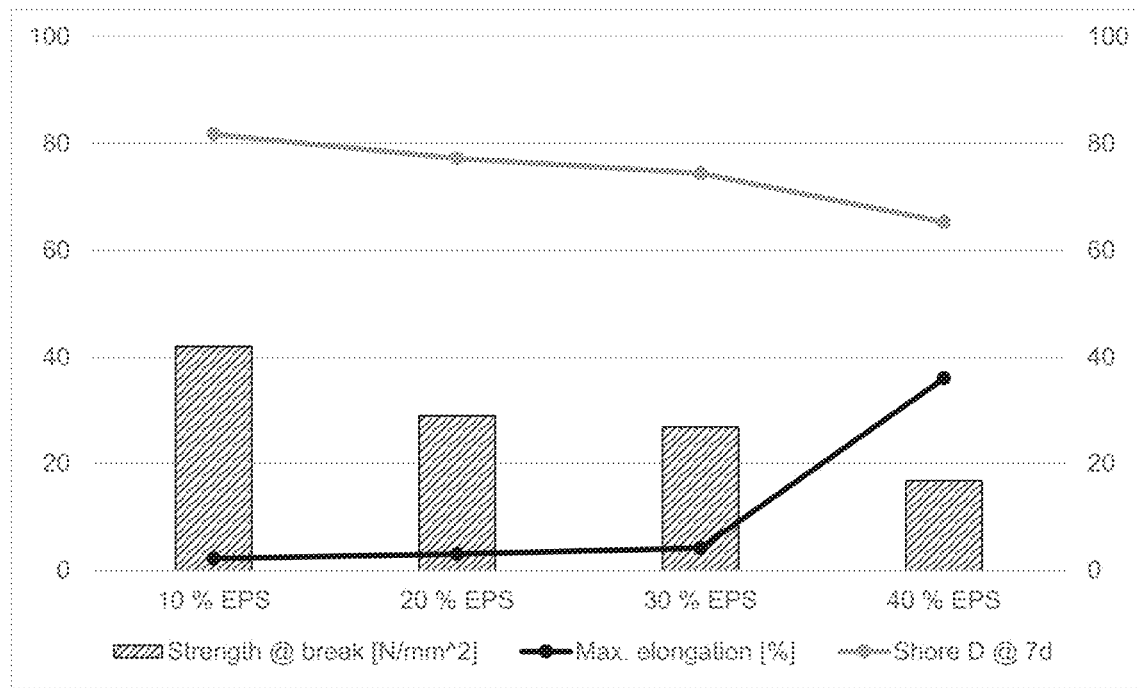
FIG. 4C shows the results of the flexibility tests of Example 3 using Thioplast EPS 70.

The properties of the epoxy-terminated polysulfide polymers (termed "EPS") were tested at different concentrations. Tensile strength at break, elongation at break and Shore hardness are measured using the methods described above. The results are shown in FIGS. 4A-4C.

Upon comparing the results of the epoxy-terminated polysulfide polymer of Example 1 (shown in FIG. 4A) with the results for Thioplast EPS 25 (shown in FIG. 4B), the polymer of the present disclosure can be seen to have better flexibility in lower concentrations. This can be seen from the maximum elongation at break.

The flexibility of the epoxy-terminated polysulfide polymer of Example 1 is also significantly better than that of Thioplast EPS 70 (shown in FIG. 4C) across all concentrations.

Whilst the present disclosure has been described with reference to an exemplary embodiment, it will be appreciated that various modifications are possible within the scope of the present disclosure.

In this specification, unless expressly otherwise indicated, the word 'or' is used in the sense of an operator that returns a true value when either or both of the stated conditions is met, as opposed to the operator 'exclusive or' which requires that only one of the conditions is met. The word 'comprising' is used in the sense of 'including' rather than to mean 'consisting of'. All prior teachings acknowledged above are hereby incorporated by reference. No acknowledgement of any prior published document herein should be taken to be an admission or representation that the teaching thereof was common general knowledge in Europe or elsewhere at the date hereof.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

What is claimed is:

1. An aliphatic epoxy-terminated polysulfide polymer with the formula

R"—CHOH—CH$_2$—S—R—(S$_y$—R)$_t$—S—CH$_2$—CHOH—R"

where each R is CH$_2$CH$_2$OCH$_2$OCH$_2$CH$_2$, y is an average value of about 2, t is about 4 to about 10, and each R" is independently a radical having a formula chosen from

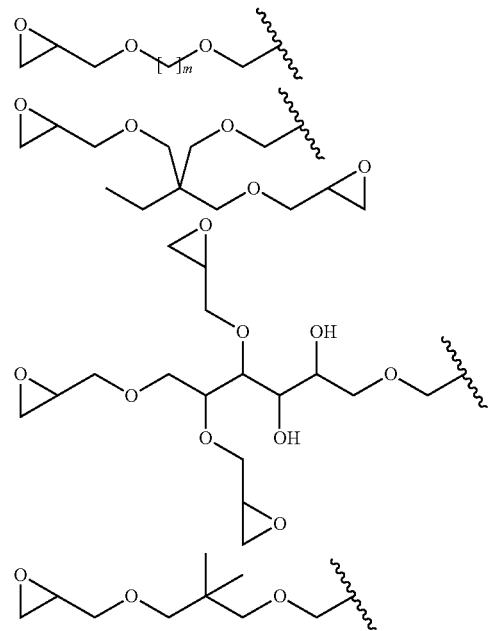

where, m has a value of from about 1 to about 10.

2. An aliphatic epoxy-terminated polysulfide polymer as claimed in claim 1, wherein R" is

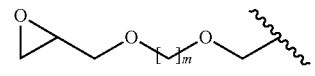

where m has a value of from about 1 to about 10.

3. An aliphatic epoxy-terminated polysulfide polymer as claimed in claim 1, wherein R" is

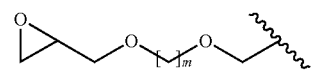

where m has a value of from about 4 to about 6.

4. An aliphatic epoxy-terminated polysulfide polymer as claimed in claim 1, having a viscosity at room temperature of from about 0.5 to about 50.0 Pa*s, as measured with a cone/plate viscosimeter.

5. An aliphatic epoxy-terminated polysulfide polymer as claimed in claim 1, having an oxirane-oxygen content of from about 0.1 to about 20.0%, as determined according to EN ISO 7142:2007.

6. A process for the production of an aliphatic epoxy-terminated polysulfide polymer of claim 1 comprising the step of reacting at least one polyepoxide with at least one polysulfide in the presence of an amine catalyst at a temperature of from about 20 to about 150° C., wherein the at least one polysulfide is a compound of the formula HS—R—(S$_y$—R)$_t$—SH   (I)

where each R is CH$_2$CH$_2$OCH$_2$OCH$_2$CH$_2$, y is an average value of about 2, t is about 4 to about 10, and wherein the at least one polyepoxide is a compound having a formula chosen from

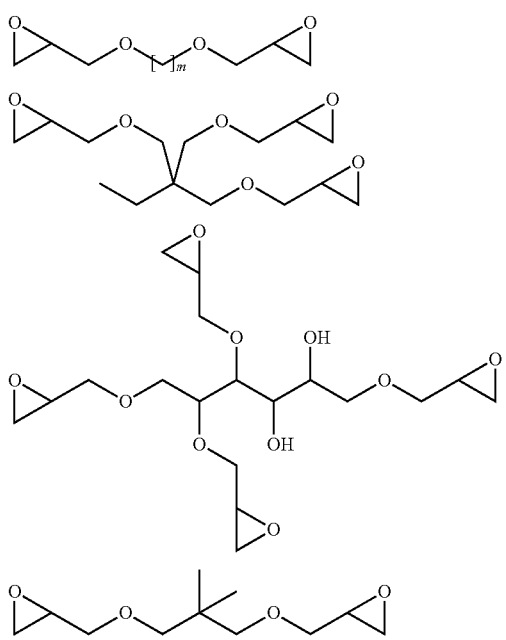

where, m has a value of from about 1 to about 10.

7. A process as claimed in claim 6, wherein the at least one polyepoxide is

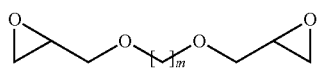

where m has a value of from about 1 to about 10.

8. A process as claimed in claim 6, wherein the at least one polyepoxide is 1,4-Butanediol diglycidyl ether or 1,6-Hexanediol diglycidylether.

9. A process as claimed in claim 6, wherein the reaction is carried out in a molar ratio of about 2 mol of poly sulfide to about 4 mol of polyepoxide.

10. A process as claimed in claim 6, wherein the amine catalyst is chosen from methyl diethanolamine, triethylene diamine, methyldiethanol amine, bis(dimethylaminoethyl) ether, N,N-dimethylpiperidine, benzyldimethylamine, 2,4,6-tris(dimethylaminomethyl)phenol, dimethyldioctadecylammonium chloride, diethyl ester dimethyl ammonium chloride, benzyltriethylammonium chloride, methyltricaprylammonium chloride, methyltributylammonium chloride, methyltrioctylammonium chloride, and combinations thereof.

11. A process as claimed in claim 6, wherein the at least one polyepoxide is

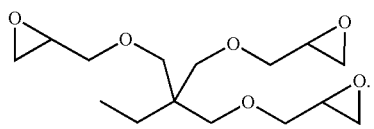 [SMILES: CCC(COCC1CO1)(COCC1CO1)COCC1CO1]

12. A process as claimed in claim 6, wherein the at least one polyepoxide is

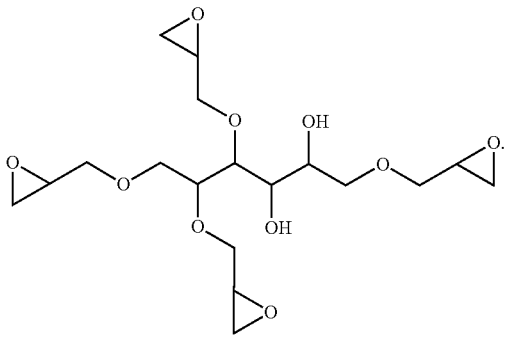 [SMILES: OC(COCC1CO1)C(O)C(OCC1CO1)C(COCC1CO1)OCC1CO1]

13. A process as claimed in claim 6, wherein the at least one polyepoxide is

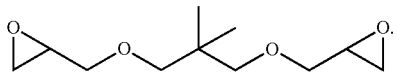

14. An aliphatic epoxy-terminated polysulfide polymer as claimed in claim 1, wherein R" is

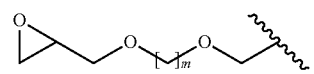

where m has a value of from about 2 to about 8.

15. An aliphatic epoxy-terminated polysulfide polymer as claimed in claim 1, wherein R" is

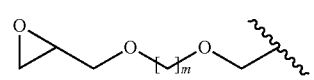

where m has a value of from about 3 to about 7.

16. An aliphatic epoxy-terminated polysulfide polymer as claimed in claim 1, wherein R" is

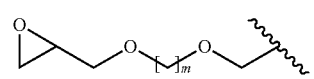

where m has a value of from about 4 to about 6.

17. An aliphatic epoxy-terminated polysulfide polymer as claimed in claim 1, wherein R" is

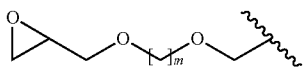

where m has a value of about 4.

18. An aliphatic epoxy-terminated polysulfide polymer as claimed in claim 1, wherein R" is

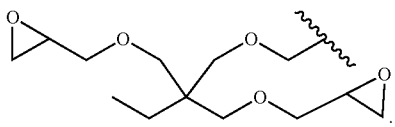 [SMILES: *COCC(CC)(COCC1CO1)COCC1CO1]

19. An aliphatic epoxy-terminated polysulfide polymer as claimed in claim 1, wherein R" is

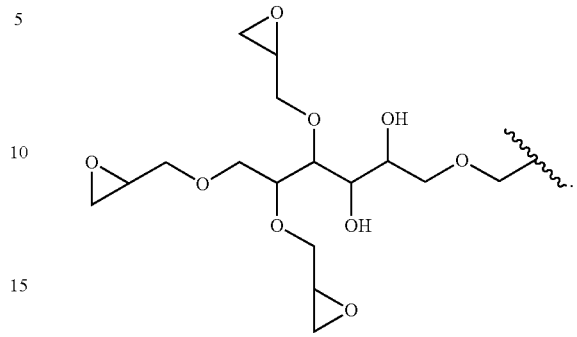

20. An aliphatic epoxy-terminated polysulfide polymer as claimed in claim 1, wherein R" is

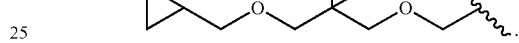

* * * * *